(12) United States Patent
Flanagan

(10) Patent No.: US 6,693,972 B1
(45) Date of Patent: Feb. 17, 2004

(54) DATA APPARATUS FOR MAINTAINING ANALOG LINE SIGNAL DURING A DATA SAMPLE UNDERRUN CONDITION

(76) Inventor: Richard Thomas Flanagan, 60 Pheasant Run, Freehold, NJ (US) 07728

( * ) Notice: Subject to any disclaimer, the term of this patent is extended or adjusted under 35 U.S.C. 154(b) by 0 days.

(21) Appl. No.: 09/456,159

(22) Filed: Dec. 7, 1999

(51) Int. Cl.[7] .......................... H04L 27/04; H04L 27/12; H04L 27/20
(52) U.S. Cl. ........................................ 375/295; 375/222
(58) Field of Search ............................ 375/222, 240.14, 375/240.26, 326, 240.25, 240.05, 295; 370/235; 380/48; 709/237; 710/52

(56) References Cited

U.S. PATENT DOCUMENTS

| | | | | |
|---|---|---|---|---|
| 5,721,830 A | * | 2/1998 | Yeh et al. .................... | 709/237 |
| 5,745,522 A | * | 4/1998 | Heegard ....................... | 380/46 |
| 6,327,249 B1 | * | 12/2001 | Cookman et al. ........... | 370/235 |

* cited by examiner

Primary Examiner—Stephen Chin
Assistant Examiner—Curtis Odom
(74) Attorney, Agent, or Firm—Lucent Technologies Inc.

(57) ABSTRACT

A data apparatus (e.g., a modem) continues to generate an analog line signal acceptable to a remote data apparatus' receiver when software fails to deliver samples used to generate the line signal to the hardware in time. The data apparatus uses symbols, rather than samples, which are transmitted from a data-pump unit software to an analog front-end (AFE) unit to generate the analog line signal. When the data-pump is late in providing a new set of symbols, the AFE unit uses previous symbols, randomized versions of previous symbols, or some other source of acceptable symbols to generate a transmit line signal. While data errors will still occur, these data errors are a normal occurrence for data apparatus and a link-layer protocol will detect and retransmit the erred data. The invention avoids having the line signal distorted, which can create data transmission outages due to the remote data apparatus entering into a rate change, initiating a retrain operation, or failing entirely.

9 Claims, 3 Drawing Sheets

US 6,693,972 B1

DATA APPARATUS FOR MAINTAINING ANALOG LINE SIGNAL DURING A DATA SAMPLE UNDERRUN CONDITION

TECHNICAL FIELD OF THE INVENTION

This invention relates to modems and, more particularly, to a modem implementation that can maintain an acceptable analog line signal during an underrun condition.

BACKGROUND OF THE INVENTION

Voice-band modems are typically implemented in software, with the software executing on a digital signal processor (DSP), a microprocessor, or a combination of the two. The modem itself is usually viewed as two distinct functional pieces—the controller and the data-pump. The controller performs functions including link-layer protocols, data compression, and provides the Data Communications Equipment (DCE) interface functions. The data-pump performs the modulation/demodulation function, translating binary information into a signal suitable for transmission over the General Switched Telephone Network (GSTN) and back again. Shown in FIG. 1 is a typical modem data-pump system diagram.

The hardware that interfaces the data-pump to the GSTN is often referred to as an Analog Front End (AFE) 100. The AFE 100 includes a coder/decoder (codec) 101, which provides analog-to-digital conversion and digital-to-analog signal conversion, and other hardware associated with transmitting and receiving an analog signal on the GSTN. The AFE often includes a buffer 102, a small temporary storage for received data samples and for data samples to be transmitted. When the buffer needs to be serviced, the AFE can signal data-pump unit 103, usually by generating an interrupt. The data-pump unit will respond and provide samples to be transmitted over line 104, accept samples to process that were received over line 104, or both.

The requirement to service the interrupt on time is referred to as a hard real-time requirement. This means that an unacceptable result will occur if the time schedule is not kept. This is due to the fact that, if the line signal is disrupted, the modems' receiver can fail. This may be true even for relatively short disruptions in the line signal. The processing done in a modem's receiver, such as adaptive equalization, timing recovery, and carrier recovery, can be upset by disruptions in the line signal. Also, modems often transmit data in a framed format and, if the frame alignment is disrupted, the data may not be received correctly.

The buffer size requirements for the AFE 100 involve a design tradeoff. Large buffers allow the interrupt latency requirement to be relaxed, giving the data-pump more time to respond to the service request, but delay is introduced in the system. Transmission delays are undesirable for some forms of data such as data associated with multimedia applications that transmit voice. Small buffers provide short delays but require interrupts to be serviced promptly or the modem's transmitter will underrun (run out of samples to transmit) and/or the modem's receiver will overrun (have too many samples to save in local buffer storage) and the local or remote modems' receivers may fail.

The U.S. Pat. No. 5,721,830, issued to H. C. Yeh et al on Feb. 24, 1999, describes a modem using a typical buffered system in which a first buffer is being read out, a sample at a time, while a second buffer is being loaded. When the first buffer is empty, samples are transferred from the second buffer to the first buffer. If no new samples are in the second buffer, then the old samples present in the second buffer are transferred to the first buffer and used to generate a line signal.

Repeating old samples is a typical failure mode for systems that do not service the AFE on time. If the sample buffer has not been updated with new samples, then old samples present in the buffer are used by default. The line signal is necessarily distorted by the discontinuity when switching from valid samples to old samples used as a maintenance signal and back again. So the Yeh patent does not fundamentally change the existing art where previously transmitted samples are retransmitted.

Therefore, there is a continuing need in modem design to reduce the undesirable effects at the receiving modem caused by an underrun condition at the transmitting modem.

SUMMARY OF THE INVENTION

My invention is directed to a data apparatus (e.g., a modem) which continues to generate an analog line signal acceptable to a remote data apparatus' receiver when data apparatus software is late in responding to the hardware used to generate the analog line signal.

In accordance with the invention, the data apparatus uses symbols, rather than samples, which are transferred from a data-pump unit to an AFE unit to generate the analog line signal. The AFE implements the conversion from symbols to samples that constitute the signal for transmission, such as implementing the convolution described above.

When the data-pump is late in providing a new set of symbols, the AFE unit uses previous symbols, randomized versions of previous symbols, or some other local source of acceptable symbols to generate a transmit line signal, thus providing an acceptable line signal for the remote-end modem. For many modems this line signal is indistinguishable from a line signal where the underrun did not occur as the pulses, defined by the pulse shaping filter, are not distorted.

While data errors still occur due to transmitting incorrect symbols, data errors are a normal occurrence for a physical-layer data apparatus and a link-layer protocol will detect and retransmit the erred data. The invention avoids transmitting a degraded line signal that can create a failure at the physical-layer. This failure can cause data transmission outages due to the remote data apparatus entering into a rate change, initiating a retrain operation, or terminating the data transmission session, all of which are undesirable.

More specifically, a data apparatus comprises (1) a data-pump unit for converting binary data into data symbols for transmission at a predetermined symbol rate; and (2) an analog unit including (a) a buffer for storing transmit data symbols, (b) a transmitter unit for accessing the stored data symbols from the buffer unit and converting them to a sample signal at a predefined sample rate, (c) a codec for converting the sample signal to an analog line signal for transmission over an analog facility, and (d) an optional underrun data symbol generator to provide data symbols when the buffer unit is empty.

Figure 1:
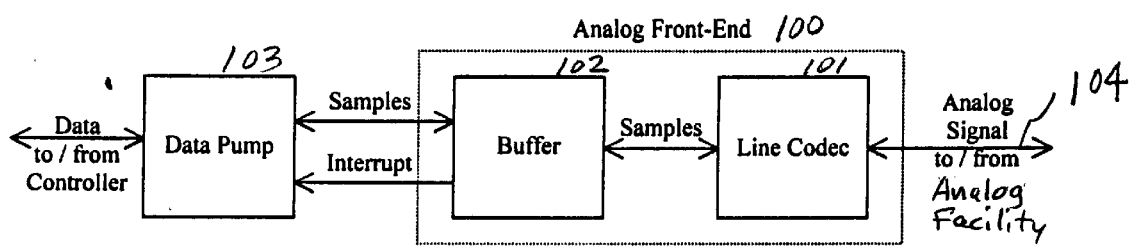
FIG. 1 shows an illustrative block diagram of a prior art modem data-pump apparatus.

In the following description, each item or block of each figure has a reference designation associated therewith, the first number of which refers to the figure in which that item is first described (e.g., 101 is first described in FIG. 1).

DETAILED DESCRIPTION

In accordance with the present invention, my data apparatus (e.g., voice-band modem, DSL modem, etc.) substantially eliminates the undesirable effects at the receiving data apparatus caused by an underrun condition at the transmitting data apparatus. The invention enables the transmitting data apparatus to continue to generate an analog line signal acceptable to a remote data apparatus receiver when the data transmitter apparatus software fails to service the AFE in time.

The invention is applicable to a broad class of modems that use a form of Pulse Amplitude Modulation (PAM) [see, for example the book "Digital Communication", Second Edition, Edward A. Lee and David G. Messerschmitt, chapter 6]. This class includes modems that use QAM, such as ITU recommendations V.90, V.34, V.32 bis/V.32, and V.22 bis/V.22, and Discrete Multitone (DMT) systems and Carrierless Amplitude-modulation Phase-modulation (CAP) systems such as those used in Digital Subscriber Line (DSL) applications.

In PAM systems, data is converted from a binary form into symbols by a coder. The symbols are from an alphabet defined by the modem designer. Coders can be relatively simple (such as in On/Off Keying, or OOK) or complex, such as in trellis coded systems or multicarrier systems.

Using basic baseband PAM as an example, symbols $A_m$ output from the coder and are converted into a discrete line signal $S_k$ by convolving the symbols with a transmit pulse-shaping filter g(k) of length 2x−1, where k is a sample time index, m is a symbol time index, and 1/T is the symbol rate, as shown in Equation 1 below.

Equation 1:

$$S_k = \sum_{m=-x}^{x} A_m g(k - mT)$$

In practical systems the line signal $S_k$ is a sequence of overlapping pulses whose shape is determined by g(k) and whose amplitude is determined by the symbol sequence $A_m$.

One failure mode in the current art when an underrun occurs is to repeat the last set of samples, $S_k$, in the transmit buffer. Such a technique is the subject matter of the previously referenced U.S. Pat. No. 5,721,830. There are several shortcomings to this failure mode.

A key shortcoming is that the line signal is necessarily distorted in practical systems where line signal $S_k$ is constructed of overlapping pulses. Since these pulses span multiple symbol periods, even a short sequence of the line signal contains information from multiple symbols. Instantaneously switching to a maintenance signal will necessarily distort the information content of the symbols by truncating a number of pulses when the maintenance signal is started and when it is discontinued.

Figure 2:
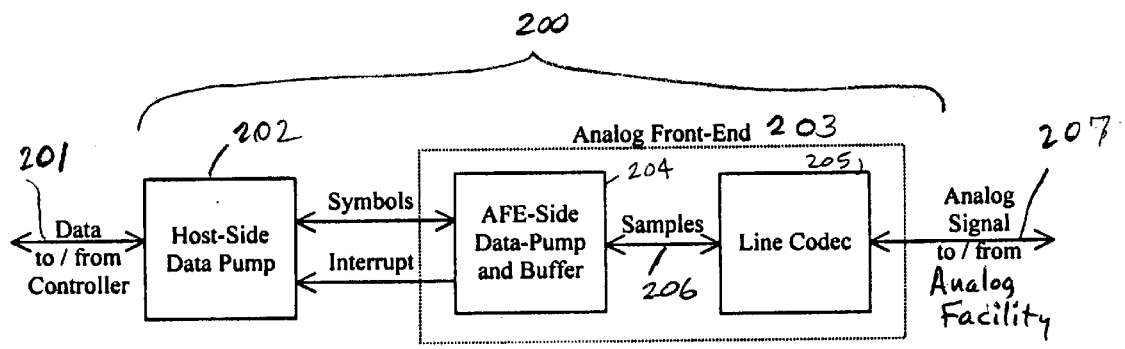
FIG. 2 shows a simplified diagram of my split-architecture modem data-pump apparatus.

With reference to FIG. 2, there is shown a block diagram of an illustrative split-architecture data-pump system 200 in accordance with the present invention. Such a split-architecture data pump system is similar to my pending patent application entitled "Split-Architecture Modem," Ser. No. 09/136,257, which was filed on Aug. 19, 1998 and which is incorporated by reference herein.

At data-pump system 200, data is received from and is transmitted to a controller (not shown) over facility 201. The controller performs the link-layer protocols, data compression, and user interface functions for the data apparatus. The data-pump system 200 includes a Host-Side Data-Pump (HSDP) unit 202 and an Analog Front-End (AFE). The Controller (not shown) and HSDP 202 are essentially performed in software using a general-purpose processor (GPP). The AFE 203 functions are essentially performed in software by a digital signal processor (DSP) and by hardware. The particular operations of the GPP and DSP are described in my previously referenced application.

HSDP 202 encodes the binary data from facility 201 into symbols that are sent to AFE 203. It also converts symbols received from AFE 203 into binary data for transmission to the controller via facility 201. The AFE 203 illustratively includes an AFE-Side Data-Pump (ASDP) unit 204 and a line codec unit 205. AFE 203 provides an interrupt signal to HSDP 202 when it needs servicing, typically when it needs symbols to transmit to the analog facility 207, or both. Under normal operation, when the interrupt is received, HSDP 202 sends and receives symbols to ASDP 204. ASDP 204 filters the symbols with a pulse-shaping filter to generate transmit samples to send over path 206 to codec 205. In accordance with my invention, ASDP 204 optionally contains circuitry to generate symbols acceptable to the remote modem.

The codec 205 receives the data samples from ASDP 204 over path 206 and converts them into an analog signal over facility 207. Codec 205 also receives signals over facility 207 that are sampled and quantized to form received samples that are sent to ASDP 204 over path 206. ASDP 204 receives these samples and converts them into a symbols which it stores in its receive buffer. When HSDP 202 responds to the interrupt, it writes symbols to the transmit buffer and reads symbols from the receive buffer of ASDP 204.

According to my invention, when HSDP 202 is late in providing a new set of symbols to AFE 203, AFE 203 can use previous symbols Am, randomized versions of these previous symbols, or some other source of acceptable symbols, to generate the transmit analog line signal.

Typically it is advantageous that the symbols appear random, their average power be the same as during normal operation, and they should be from the set of valid transmit symbols. Note that these requirements apply for relatively long sequences of symbols, and that relatively short sequences of symbols may vary from these requirements.

If needed, as when the modem uses a framed data format, AFE 203 can inform the HSDP 202 that an underrun or overrun occurred and how many symbols were retransmitted or deleted, respectively, until the AFE 203 was serviced. HSDP 202 can then adjust its transmit and/or receive symbol stream to account for any skew in frame alignment and continue operation.

Thus, while not transmitting the correct symbols will cause data errors to occur, such data errors are a normal occurrence and will be detected by a link-layer protocol. The link-layer protocol in the controller section of the data receiving apparatus will treat these errors as common transmission errors due to imperfect operation of the physical-layer modem and request retransmission of the erred data.

Thus, my invention avoids causing a line signal disruption on facility 207, which can create data transmission outages due to the data receiving apparatus failing, entering into a rate change, or initiating a retrain procedure, all of which are undesirable.

Another way of describing the value in my invention is that is removes a hard real-time requirement for receiving samples and replaces it with a soft real-time requirement for receiving symbols. This allows looser tolerances on the interrupt latency of HSDP 202 for servicing AFE 203 or, equivalently, allows AFE buffer size to span a shorter period of time for the same interrupt latency tolerances. This allows the data-pump system 200 to be better optimized for both low delay and robustness.

Figure 3:
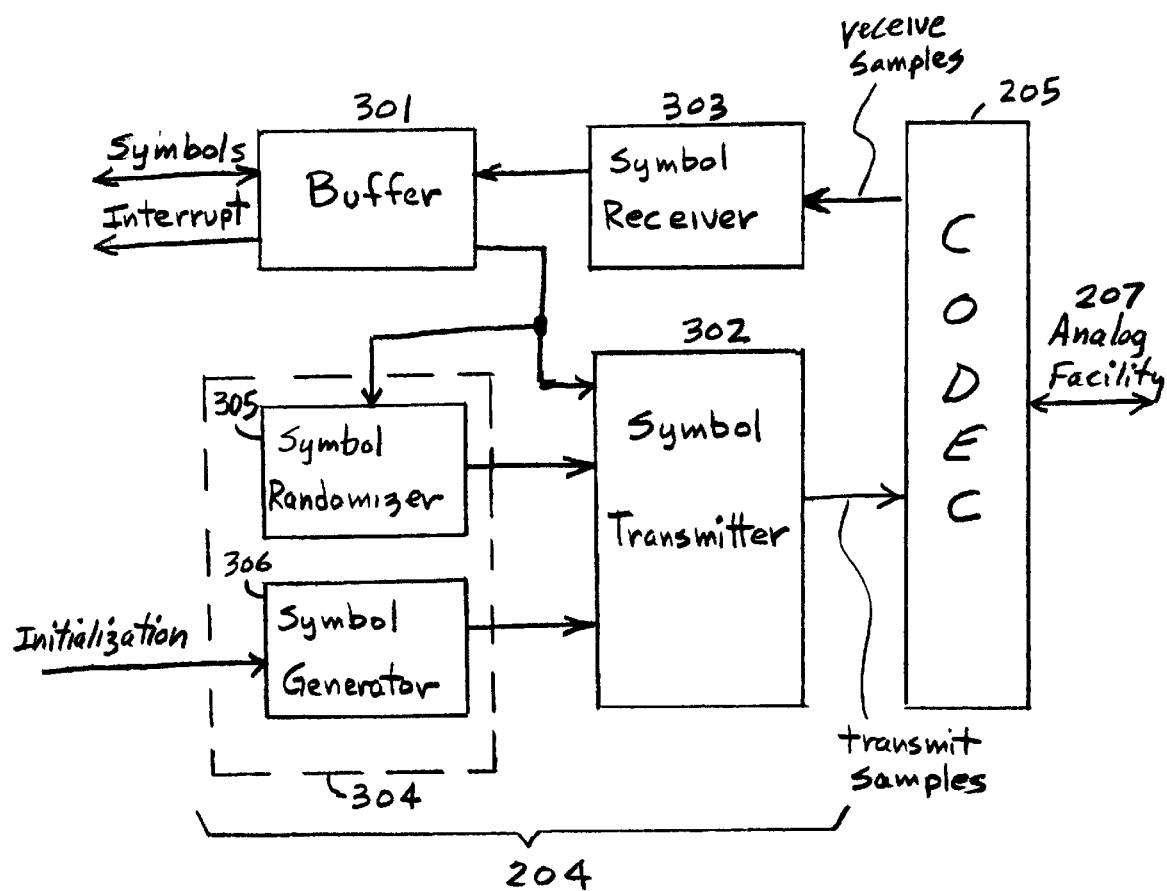
FIG. 3 shows, in accordance with the present invention, a more detailed block diagram of the Analog Front-End (AFE) unit of FIG. 2.

With reference to FIG. 3, there is shown a diagram of AFE 203 of FIG. 2 including a block diagram of ASDP 204. ASDP 204 is shown to include a Buffer unit (BU) 301, a Symbol Transmitter unit 302, a Symbol Receiver unit 303, and an optional Underrun Symbol unit 304. The Underrun Symbol unit 304, illustratively, includes Symbol Randomizer 305 and Symbol Generator 306.

The Buffer unit 301 stores data symbols to be received from and stores data symbols to be transmitted to HSDP 202. The Transmitter unit 302 filters the received symbols at a predefined sample rate and modulates the samples at an appropriate frequency and sends the modulated samples to Codec 205 for transmission over analog facility 207.

Figure 4:
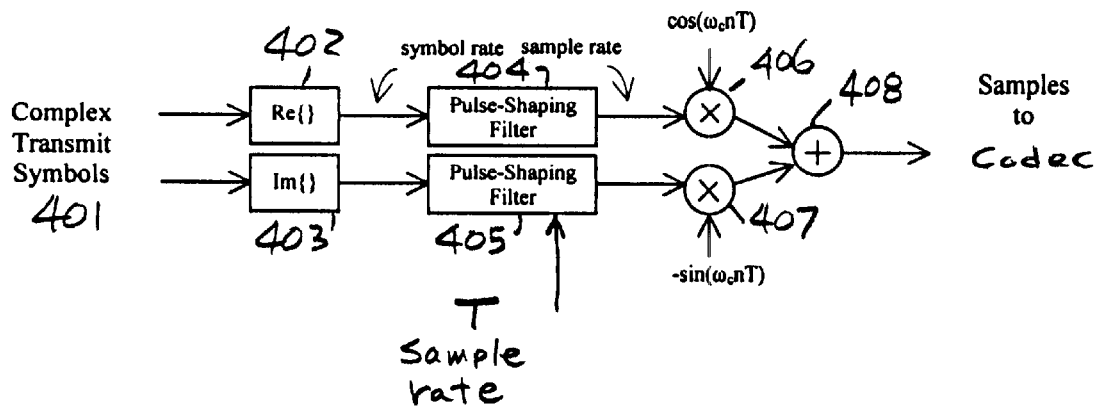
FIG. 4 shows a circuit diagram of a transmitter unit which illustratively generates Quadrature Amplitude Modulation (QAM) symbols in FIG. 3.

FIG. 4 shows an illustrative QAM circuit diagram of Transmitter unit 302. As previously noted, the complex transmit symbols 401 are typically obtained from Buffer unit 301. The real 402 and imaginary 403 components of the symbols are filtered at the sample rate $1/T_s$ by the Pulse-Shaping Filters 404 and 405, respectively. The resulting real and imaginary signal are each modulated by quadrature carriers at frequency $\omega_c$ in Modulators 406 and 407, respectively, combined by Combiner 408, and the resulting samples sent to Codec 205 for transmission over analog facility 207.

Returning to FIG. 3, analog signals received over facility 207 are converted to samples in codec 205. Samples from Codec 205 are sent to Receiver unit 303 for demodulation and the demodulated symbols are stored in Buffer unit 301 for delivery to Host-Side data-pump 202.

During an underrun condition transmit symbol unit 302 can continue to input symbols from Buffer 301. Typically a fixed number of symbols would be accepted at one time and transmitted where the number of symbols is the same as the number of symbols transferred to the buffer in response to an interrupt requesting symbols to transmit. This arrangement will suffice if the time interval of the underrun is relatively short.

Optionally, more elaborate methods of creating a sequence of valid symbols to transmit can be employed if the underrun condition can be relatively long. In that case repeating a symbol sequence multiple times can have undesirable properties not indicative of a typical line signal due to the periodicity, as a typical line signal should be indicative of random data. It may also have an average power significantly different from the normal line signal. The symbol sequence used during the underrun can be made pseudo-random and with the correct average power to avoid this problem of repeating a relatively small set of symbols. Several methods are shown in Optional Data Symbol Generator 304.

In one embodiment, Symbol Randomizer 305 is connected to the Buffer unit 301. The randomizer inputs valid symbols and, using a pseudo-random algorithm, generates new valid symbols.

An example for would be to have Randomizer 305 read symbols from Buffer unit 301 in a pseudo-random order and then send the symbols to Transmitter unit 302. By reordering the symbols in this manner, the data symbols generated by Symbol Generator 306 will appear random and will not exhibit an undesirable periodicity in the frequency spectrum of the transmitted analog signal. The power of the symbols would be unaltered.

Another example applicable to modulations that employ complex symbols, such as used in QAM and CAP, would be to have randomizer 305 read symbols from Buffer 301 and apply rotation of 90, 180, and 270 degrees, with the rotation selected pseudo-random fashion, and provide these symbols to Symbol Transmitter 302.

Figure 5:
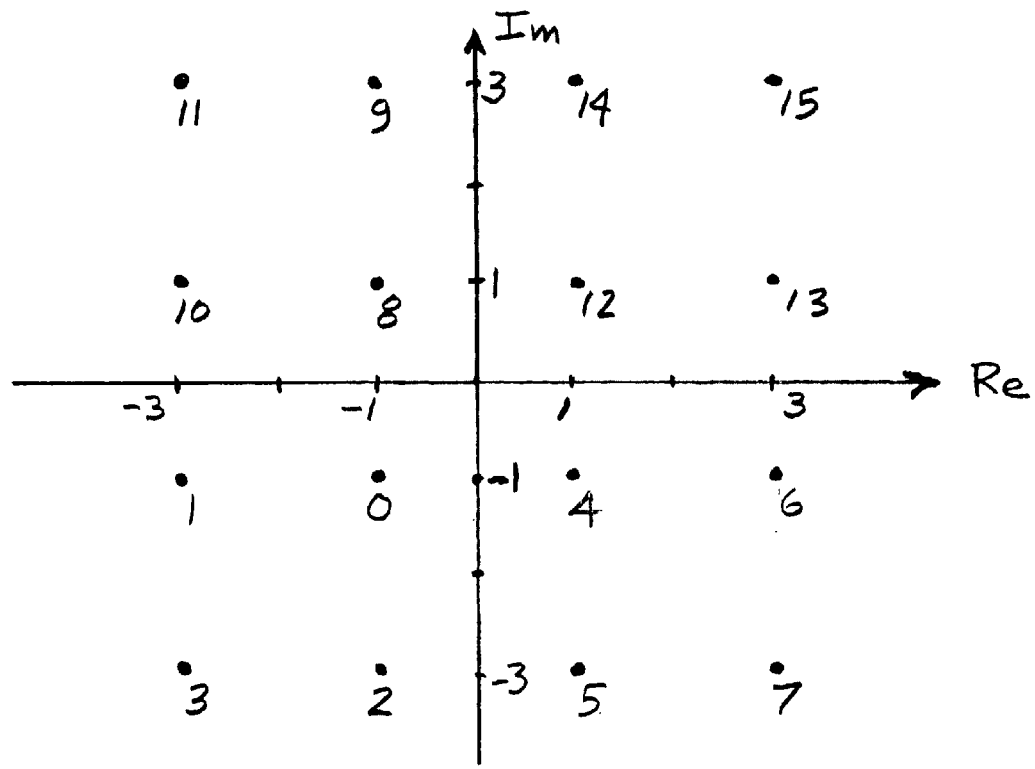
FIG. 5 shows a well known QAM signal constellation.

FIG. 5 shows a QAM constellation showing 16 complex symbols labeled with decimal integers between 0 and 15. Each symbol is used to represent possible combinations of a group of 4 binary bits. This constellation is used in a variety of industry-standard QAM modems, including ITU Recommendations V.32bis, V.32, and V.22 bis.

A characteristic of this constellation, and virtually all QAM constellations that are used in practical systems, is that the resultant constellation is the same for any number of 90 degree rotations. Thus, to randomize a symbol sequence, some or all of the symbols may be rotated 0, 90, 180, or 270 degrees in a pseudo-random fashion. This rotation has the property that it preserves the power level of the individual symbols but randomizes the symbol sequence. By rotating the symbols in this manner, the data symbol sequence generated by Symbol Generator 306 will appear random and will not exhibit an undesirable periodicity in the frequency spectrum of the transmitted analog signal.

In a third embodiment of Symbol Randomizer 305, the symbols received them from Buffer 301 could be translated into new valid symbols using a suitable pseudo-random algorithm operating on the symbol alphabet.

For example, using the QAM constellation in FIG. 5, adding 2N to the real and imaginary components of the constellation for any integer N, then performing a modulo 4 operation on the components, will generate another symbol from the same set of 16 symbols. With a pseudo-random N for each component, the new symbols generated by data symbol generator 304 will appear random and will not exhibit an undesirable periodicity in the frequency spectrum of the transmitted analog signal. The power of the individual symbols could change but the average power of the symbol sequence would be the average power of the symbol set assuming a uniform probability, which is the typically desired case.

In another embodiment a Pseudo-Random Symbol generator 306 could be used as a source of symbols during an underrun condition. Symbol Generator 306 does not receive symbols from Buffer 301, but is initialized with symbols, information, or both, allowing the unit to generate acceptable symbols during an underrun condition. Using FIG. 5 as an example, the generator could select, in a pseudo-random fashion, from the set of numbers $\{-3, -1, 1, 3\}$ and use those numbers as the real and imaginary components of symbols to provide to Symbol Transmitter 302. The average power of the symbol sequence would be the average power of the symbol set assuming a uniform probability, which is the typically desired case.

In another embodiment, the Symbol Generator 306 may include a Pseudo-Random Symbol generator which stores a set of valid symbols to provide during an underrun condition. These may be sufficient in number so they can be read sequentially and provided to symbol transmitter 302. If the number of symbols is relatively small, the symbols can be randomized as illustrated in the methods detailed above or by using some other method.

Note that modems used in central-site applications, referred to as Remote Access Server (RAS) modems, may have their codec located a considerable physical distance away from the where the rest of the modem is located. This is due to the codec being present where the telephone wire is terminated in network equipment and the modem may be accessed by sending the sampled data, using standard digital transmission equipment, to a location where the modem is located. Modems of this type are said to be digitally connected. The present invention is applicable whether or nor the codec is local to the AFE or is remotely located.

Additionally, since the same underrun condition can also occur in other modems, such as in Digital Subscriber Line (DSL) modems, my invention applys equally to a DSL modem, or any other data modem that has to interface to an analog line and can subdivide the process of generating a line signal from data into first—an intermediate symbol form and second—to the line signal.

What has been described is merely illustrative of the application of the principles of the present invention. Other arrangements and methods can be implemented by those skilled in the art without departing from the spirit and scope of the present invention.

What is claimed is:

1. A data transmission apparatus comprising
   a data-pump unit for converting a data bit stream into data symbols at a predetermined symbol rate; and
   an analog front-end (AFE) unit including
   a buffer for storing data symbols periodically received from the data-pump unit,
   a transmitter unit for accessing the stored data symbols from the buffer unit and converting them to a digital signal at a predefined sample rate,
   a codec for converting the digital signal from the transmitter unit to an analog signal for transmission over a facility,
   where, in response to an underrun condition when new symbols required for transmission are not available from the data-pump unit, the AFE unit retransmits randomized versions of stored symbols from the buffer so as to maintain an analog signal connection over the facility.

2. The data transmission apparatus of claim 1 wherein
   in response to an underrun condition, when new symbols required for transmission are not available from the data-pump unit, the AFE unit transmits symbols from the buffer in a pseudo-random order.

3. The data transmission apparatus of claim 1 wherein
   the AFE unit includes a randomizer unit that converts symbols previously received from the data-pump unit and generates a different sequence of valid symbols than the symbol sequence in the buffer and
   where, in response to an underrun condition when new symbols required for transmission are not available from the data-pump unit, the AFE unit transmits symbols from the randomizer unit.

4. The data transmission apparatus of claim 1 wherein
   the AFE unit includes a symbol generator unit that outputs valid symbols independent of the symbols in the buffer for transmission and
   where in response to an underrun condition, when new symbols required for transmission are not available from the data-pump unit, the AFE unit transmits symbols from the symbol generator unit.

5. The data transmission apparatus of claim 4 wherein the data symbol generator includes
   a memory unit containing a group of pre-stored data symbols.

6. The data transmission apparatus of claim 4 wherein the data symbol generator includes
   a randomizer unit which inputs data symbols from the memory unit and outputs a different sequence of valid symbols.

7. The data transmission apparatus of claim 1 being part of a modem.

8. The data transmission apparatus of claim 1 wherein the codec is remotely located from the transmitter unit.

9. A method of operating a data transmission apparatus comprising the steps of:
   converting a received data bit stream into data symbols at a predetermined symbol rate;
   storing data symbols that are periodically received in a buffer,
   accessing the stored data symbols and converting them to a digital signal at a predefined sample rate,
   converting the digital signal to an analog signal for transmission over a facility, and
   in response to an underrun condition when new symbols required for transmission are not available, retransmitting randomized versions of stored symbols from the buffer so as to maintain an analog signal connection over the facility.

* * * * *